3,198,188
VALVE STEM SEAL

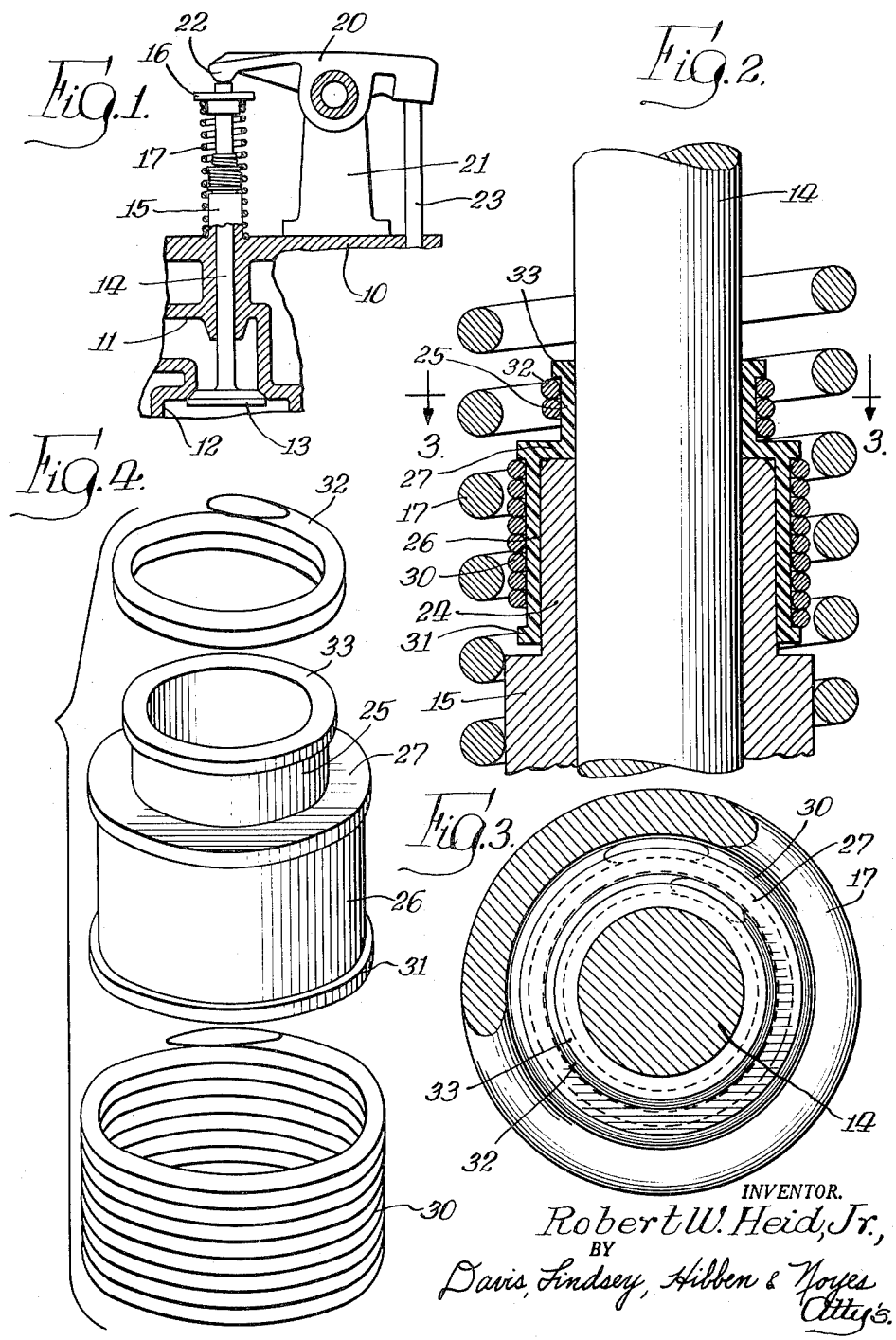

Robert W. Heid, Jr., Richmond, Ind., assignor, by mesne assignments, to Perfect Circle Corporation, Hagerstown, Ind., a corporation of Indiana
Filed Mar. 29, 1961, Ser. No. 99,264
2 Claims. (Cl. 123—188)

The invention relates to a seal for the stem of a valve for an internal combustion engine.

In internal combustion engines, the intake and exhaust valves are spring urged in one direction and cam operated in the other direction through rocker arms in the case of an overhead valve engine, or through plungers in the case of an L-head engine. Each valve comprises a valve head and a stem reciprocably mounted in a guide, with the end of the stem engaged by the rocker arm or plunger, as the case may be, and with the spring surrounding the guide and stem. The guide may be an integral part of the cylinder head or cylinder block, or may comprise a separate member fitted in the cylinder head or cylinder block. In the case of the overhead valve engine, oil is usually supplied through the rocker arm to the point of contact with the end of the valve stem, and the oil runs along the stem to lubricate the guide. As wear occurs in the guide or on the stem, the oil tends to work through the guide to the head of the valve where it may be drawn into the combustion chamber portion of the cylinder and head in the case of an intake valve, or will be contacted by the hot exhaust gases in the case of an exhaust valve. In either instance, the oil will be burned, causing smoke in the exhaust, as well as a waste of oil. Similar conditions will occur in the case of an L-head engine.

The general object of the present invention is to provide a novel seal for the stem of a valve to prevent excess oil from entering the valve stem guide.

Another object is to provide a novel valve stem seal adapted to be mounted so as not to interfere with the action of the spring.

A further object is to provide a novel valve stem seal of relatively few, easily manufactured parts.

Other objects and advantages will become apparent from the following description taken in connection with the accompanying drawing, in which:

FIG. 1 is a fragmentary elevational view, partly in section, of a valve operating mechanism of an internal combustion engine, with the stem of the valve provided with a seal embodying the features of the invention;

FIG. 2 is an enlarged longitudinal sectional view of the seal illustrated in FIG. 1 and showing it mounted on a valve stem and valve stem guide;

FIG. 3 is a transverse sectional view taken on the line 3—3 of FIG. 2; and

FIG. 4 is a perspective view showing the various parts of the seal.

For purposes of illustration, I have shown a seal embodying the features of the invention, in connection with an engine of the overhead valve type. In FIG. 1 of the drawing, a fragmentary portion of such an engine is shown. Thus, the cylinder head of the engine is partially illustrated in section at 10. The head 10 is shown as being provided with a passage 11 communicating with the combustion chamber fragmentarily shown at 12, the opening of the passage 11 into the combustion chamber 12 being controlled by a valve comprising the usual valve head 13 formed on one end of a stem 14. The latter extends through the cylinder head 10 and is reciprocably supported by a guide 15, which in this instance is shown as a separate part rigidly mounted in the cylinder head. The guide 15, of course, may be of the character shown or may be made integral with the cylinder head.

The valve stem 14 extends upwardly beyond the guide 15 at its upper end and is usually provided with a plate 16 engaged by one end of a coil spring 17, the other end of the spring being shown as seated on the cylinder head. The spring thus tends to move the valve head 13 to a closed position. For opening the valve, a rocker arm 20 is shown as rockably mounted on a bracket 21 extending upwardly from the cylinder head, with one end 22 engaging the upper end of the valve stem 14. To operate the rocker arm 20, the other end thereof is shown as engaged by a push rod 23 which is operated by engine-driven cam means (not shown). The valve described is illustrative of either an intake valve or an exhaust valve.

To lubricate the rocker arm, oil is usually supplied to the rocker support and a passage is provided in the rocker arm for conducting oil to the end 22 of the rocker arm to lubricate its contact with the upper end of the valve stem 14. The oil therefrom then runs downwardly on the stem and provides lubrication for the valve stem guide 15. If the guide 15 has an excess clearance with the valve stem or such excess clearance is present after wear, the oil will continue to travel downwardly on the valve stem 14 until it reaches the valve head 13. If the valve is an intake valve, the oil will be drawn into the combustion chamber and will be burned therein, resulting in smoke in the exhaust. If the valve is an exhaust valve, the hot gases discharged from the combustion space will effect burning of the oil and will likewise result in smoke in the exhaust.

A seal embodying the features of the invention is adapted to be mounted on the valve stem 14 at the upper end of the valve stem guide 15 and is constructed to prevent excess oil from running down the valve stem into the guide, even when the guide becomes worn, but permitting sufficient oil to pass therethrough to properly lubricate the guide and stem. Generally the seal comprises a pair of collars, one adapted to embrace the valve stem at the upper end of the guide and the other adapted to fit over the guide to hold the seal in place. While, in some engines, the valve spring 17 may be of such internal diameter that the seal may be located within the spring 17 without interfering with the action of the spring, in other engines the spring may be located close to the guide. In the present instance, the end portion of the guide 15 is turned to a reduced diameter as indicated at 24, and the seal of the present invention is mounted on the reduced portion 24 and is such that it is located within the area of the unturned portion of the guide 15. The seal thus is out of the way of the spring 17.

As illustrated in the drawing, the seal is shown as comprising a pair of resilient collars, indicated respectively at 25 and 26 and integrally connected to each other. The collar 25 is cylindrical and preferably has an internal diameter slightly less than the diameter of the stem 14 so that it hugs the stem. It thus effects a seal around the stem to prevent excess oil from running down the stem to the valve head 13. The collars 25 and 26 are integrally connected by a transverse flange 27 adapted to seat against the end of the guide 15.

The collar 26 is adapted to hold the collar 25 in place at the end of the guide. It thus is generally cylindrical and has an internal diameter and length such that it firmly grips the reduced diameter portion 24 of the stem. To increase the gripping action, a coiled spring 30 may be mounted on the collar 26, the spring 30 preferably extending for substantially the major portion of the length of the collar. The spring 30 has a normal internal diameter less than the outer diameter of the collar 26 and, when in place, tends to contract about the collar to hold the latter firmly on the valve guide. To prevent the spring from shifting out of place, the flange 27 extends outwardly beyond the collar 26 at the upper end of the spring, and a flange 31 is provided at the lower end of the collar. The outside diameter of the flanges 27 and 31 and of the spring 30 are such, however, as to lie within the area of the unturned portion of the valve guide 15 so as not to interfere with the valve spring 17.

The gripping action of the collar 25 on the valve stem may also be increased, if desired, by a coiled contracting spring 32 externally surrounding the collar. The spring 32 is held in place on the collar 25 by the flange 27 at the lower end of the spring and by a small flange 33 at the upper end of the collar 25.

The resilient plastic material, of which the collars 25 and 26 are made, is such that it tends to reduce capillary flow of oil between the stem and the collar 25. This is accomplished by using a material which cannot be "wet" by the usual lubricating oil used in internal combustion engines. The tight fit of the collar 25 about the stem and the non-wetting characteristic of the material thus prevents excess flow of oil along the stem through the guide, sufficient oil passing through the seal, however, to lubricate the guide. The resilient material used is selected from the group consisting of tetrafluoroethylene polymers, commonly known as "Teflon," and trifluorochloroethylene polymers, commonly known as "Kel-F," and has the characteristics desired. Moreover, it may be readily molded in the shape herein shown. While either of these materials may be used, Teflon is preferred since it may be more readily stretched for positioning on the valve stem and on the guide and hence can accommodate greater variations in valve stem and guide diameters. Teflon also has the non-wetting characteristic to a somewhat greater degree than the Kel-F. However, both of the materials have been found satisfactory for the purposes intended.

Another advantage, related to the non-wetting characteristic of these materials, has been noted in the present instance. Thus, with either of these materials, it is found that there is a tendency for some of the material of the collar 25 to rub off slightly onto the valve stem so that the stem is likewise rendered non-wettable by oil. Consequently the opposing surfaces of the collar and the stem are both non-wettable by oil and the flow of oil therebetween is held to a minimum. The material further acts as a heat insulator to prevent conduction of heat from the valve stem to the springs 30 and 32. The material has sufficient strength for the collar 26 to firmly grip the valve stem guide even though the wall thickness of the collar is small. The outside diameter of the seal is thus such that it does not interfere with the valve spring 17.

The seal disclosed herein is of particular advantage in the newer high-compression, overhead valve engines. In such engines, a higher vacuum occurs on the intake stroke and hence a tendency to draw oil inwardly along the valve stem. On the exhaust stroke, an aspirating action may occur, which would also tend to draw oil inwardly along the valve stem. The present seal prevents such flow of oil.

The present seal also has advantages when the valve guide becomes worn. It has heretofore been the practice, when guides become worn, to ream the guides and install valves with oversized stems, to prevent undesired flow of oil through the guide. With the present seal, much greater wear in the guides can be tolerated, before reaming and installation of new valves, than was heretofore considered practical. The seal, in addition to preventing flow of oil through the guide when worn, may also prevent air being drawn in through the guide in the case of an intake valve, which air might upset the normal fuel-air ratio of the engine. In the case of an exhaust valve where the guide is worn, the seal may prevent leakage of exhaust gases through the guide. The seal also tends to hold the valve stem centered within the bore in the guide. The materials mentioned above are very durable and thus provide a seal which has a relatively long life and also is suitable for heavy duty applications.

I claim:

1. In combination with a valve stem guide for a reciprocating valve stem, said valve stem guide having a portion of reduced external diameter at its end, a seal comprising a pair of collars adapted respectively to hug said stem and to grip said reduced diameter portion, said collars being integrally and relatively rigidly connected to each other in end-to-end relation, the one of said collars which grips said reduced diameter portion being the sole means for holding the other of said collars against movement and a pair of contractile springs coiled about the respective collars to increase the hugging and gripping actions thereof, the maximum outside diameter of said seal being less than the diameter of said guide beyond said reduced portion.

2. A seal for a reciprocable valve stem and adapted to be mounted on the end of the valve stem guide, said seal comprising a pair of cylindrical collars in end-to-end relation with each other, said collars being of different diameters, a radially extending flange integrally connecting the adjacent ends of the two collars and extending beyond the larger of the two collars, a pair of additional flanges extending radially from the other ends of the respective collars, and a pair of cylindrical contractile springs coiled about the respective collars and confined between the flanges thereon.

References Cited by the Examiner

UNITED STATES PATENTS

| 1,263,901 | 4/18 | Joseph | 277—33 XR |
| 1,507,567 | 9/24 | Aschenbach | 277—153 |
| 2,321,250 | 6/43 | Russell | 277—181 |
| 2,362,125 | 11/44 | Eves | 277—157 |
| 2,878,799 | 3/59 | Brenneke | 123—188 |
| 2,906,255 | 9/59 | Bunce | 123—188 |
| 2,927,808 | 3/60 | Rosenberger | 286—11.16 |

FOREIGN PATENTS 728,823    4/55    Great Britain.

LEWIS J. LENNY, *Primary Examiner.*

KARL J. ALBRECHT, RICHARD B. WILKINSON, SAMUEL B. ROTHBERG, EDWARD V. BENHAM, *Examiners.*